United States Patent
Au Yeung et al.

(10) Patent No.: US 10,452,113 B2
(45) Date of Patent: Oct. 22, 2019

(54) POWER SUPPLY SWITCH WITH PROGRAMMABLE SWITCHING DECISION

(71) Applicant: Hong Kong Applied Science and Technology Research Institute Company, Limited, Hong Kong (HK)

(72) Inventors: Chung Fai Au Yeung, Hong Kong (HK); Chi Hong Chan, Hong Kong (HK); Hok San Yu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 6 days.

(21) Appl. No.: 15/817,445

(22) Filed: Nov. 20, 2017

(65) Prior Publication Data
US 2019/0155354 A1    May 23, 2019

(51) Int. Cl.
*G06F 1/32* (2019.01)
*G05F 1/10* (2006.01)
(Continued)

(52) U.S. Cl.
CPC .................. *G06F 1/32* (2013.01); *G05F 1/10* (2013.01); *G05F 1/565* (2013.01); *H02J 9/061* (2013.01);
(Continued)

(58) Field of Classification Search
CPC ............ H02M 3/02; H02M 3/04; H02M 3/10; H02M 3/145; H02M 3/155; H02M 3/156;
(Continued)

(56) References Cited

U.S. PATENT DOCUMENTS

| 4,617,473 A | 10/1986 | Bingham |
| 4,698,530 A | 10/1987 | Thomson |
(Continued)

FOREIGN PATENT DOCUMENTS

| CN | 1423424 A | 6/2003 |
| CN | 101841184 A | 9/2010 |
(Continued)

OTHER PUBLICATIONS

ISR and Written Opinion, PCT/CN2017/112375, dated Aug. 24, 2018.

*Primary Examiner* — Alex Torres-Rivera
*Assistant Examiner* — Carlos O Rivera-Perez
(74) *Attorney, Agent, or Firm* — Stuart T. Auvinen; gPatent LLC

(57) ABSTRACT

A programmable-threshold power supply selector has two power-supply inputs VDD1 and VDD2. The higher of these two voltages is pre-selected as a common supply that powers all transistors and circuitry in the programmable-threshold power supply selector, including substrates under transistors. An open-loop decision circuit is very stable since it uses no feedback. A tunable voltage divider divides VDD1 by a programmable divisor. The divided VDD1 is compared to a reference voltage to generate switch-control signals. The switch-control signals drive the gates of p-channel switch transistors that connect either VDD1 or VDD2 to an output supply voltage. The different programmable divisor values effectively cause VDD1 to be compared to a programmable threshold voltage VTH. The switch transistors switch the output supply voltage to VDD2 only when VDD1 falls below VTH. The output supply voltage remains at VDD1 even when VDD1 falls below VDD2, eliminating unnecessary power switching.

13 Claims, 8 Drawing Sheets

(51) Int. Cl.
*G05F 1/565* (2006.01)
*H02J 9/06* (2006.01)
*H02M 3/335* (2006.01)
*H02M 1/00* (2006.01)

(52) U.S. Cl.
CPC ... *H02M 3/33515* (2013.01); *H02M 3/33523* (2013.01); *H02M 2001/0022* (2013.01)

(58) Field of Classification Search
CPC ............ H02M 3/158; H02M 3/33515; H02M 3/33523; H02M 2001/0012; H02M 2001/0016; H02M 2001/0022; H02M 2001/0025; H02M 2001/0045; H02M 2001/0067; H02M 2001/0032; H02M 1/32; H02M 1/36; G06F 1/26; G06F 1/32; G06F 1/3203; G06F 1/3206; G06F 1/3234; G06F 1/3296; G06F 1/263; G05F 1/10; G05F 1/46; G05F 1/468; G05F 1/56; G05F 1/565; H02J 9/00; H02J 9/04; H02J 9/06; H02J 9/0068; H02J 9/0061; H02J 9/061; Y10T 307/50; Y10T 307/615; Y10T 307/62; Y10T 307/625; Y10T 307/636; Y10T 307/344
USPC ........ 323/222–226, 266, 268–276, 280–286, 323/299, 300, 303, 311–313, 351; 363/65, 123–127; 455/127.1–127.5, 455/343.1–343.6, 571–574; 307/80–82, 307/64–68, 113, 115; 327/63–67, 70, 327/72–75, 407, 408, 538, 539
See application file for complete search history.

(56) References Cited

U.S. PATENT DOCUMENTS

| | | | | |
|---|---|---|---|---|
| 5,502,682 | A * | 3/1996 | Yoshimura | G11C 5/143 365/226 |
| 6,118,384 | A * | 9/2000 | Sheldon | G06F 1/24 324/426 |
| 7,142,038 | B2 | 11/2006 | Baglin | |
| 7,298,181 | B2 | 11/2007 | Khan et al. | |
| 7,973,428 | B2 | 7/2011 | Li | |
| 8,653,884 | B2 * | 2/2014 | Miwa | G06F 1/263 307/18 |
| 8,917,114 | B2 | 12/2014 | Li | |
| 9,729,145 | B2 | 8/2017 | Sbuell | |
| 2013/0328414 | A1 * | 12/2013 | Sbuell | H03K 17/693 307/115 |
| 2014/0001861 | A1 * | 1/2014 | Mann | G06F 1/30 307/66 |

FOREIGN PATENT DOCUMENTS

| | | |
|---|---|---|
| CN | 101557122 B | 12/2010 |
| CN | 201830014 U | 5/2011 |
| CN | 102611428 B | 7/2016 |
| CN | 106026358 A | 10/2016 |
| CN | 106921211 A | 7/2017 |

* cited by examiner

POWER SUPPLY SWITCH WITH PROGRAMMABLE SWITCHING DECISION

FIELD OF THE INVENTION

This invention relates to power supply circuits, and more particularly to programmable-threshold power-supply selection circuits.

BACKGROUND OF THE INVENTION

Modern electronic systems often require reliable power supplies. Large power currents may be switched on and off as various features or operations are performed, such as when a 3D graphics accelerator is enabled or disabled. GPS receivers and other portable electronics may require a very stable power source.

Sometimes a backup power supply is used in addition to a regular power supply. For example, a main power supply might use Direct Current (D.C.) generated by an external alternating-current (A.C.) adapter, while a battery provides the backup power. A power supply switch may be used to select either the main power supply or the backup power supply to power the system.

The power supply selector may monitor the voltages of both the main and backup power supplies and select the power supply with the higher voltage. When one power supply fails and its voltage falls below that of the other power supply, the power supply selector switches to the other power supply with the higher voltage. For example, diodes may be used to select the highest power-supply voltage. However, simple diodes do not allow for controlling the switching decision.

More complex control or monitoring may be provided to detect low-voltage situations or disconnected supplies. FIG. 1 shows a prior-art power-supply switch. Two power-supply voltages VDD1 and VDD2 are provided, such as from a main and a backup power supply. Comparator 12 compares these power supply voltages and drives the gates of switch transistors 14, 16 with switch control voltages VSW1, VSW2. Switch transistors 14, 16 select either VDD1 or VDD2 to drive the output supply voltage VDO to power the system.

A problem can occur when VDD1 and VDD2 are close to each other. Comparator 12 may not be able do distinguish between input voltages that are almost equal to one another when voltage drops cause various transient effects. Comparator 12 may enter an ambiguous state and drive both outputs VSW1 VSW2 to a same low state, causing both of switch transistors 14, 16 to be turned on at the same time. Then feed-through current can flow from one supply to the other supply, such as from VDD1, through switch transistor 16 to VDO, and then through switch transistor 14 to VDD2. As power-supply voltages fluctuate, this feed-through current can become large and may cause damage.

FIG. 2 shows another prior-art power-supply controller. Decision circuit 120 monitors VDD1 and VDD2 to drive VSW1 and VSW2 to control the gates of switch transistors 14, 16. Decision circuit 120 relies on some sort of feedback from output voltage VDO to decide which of VDD1 or VDD2 to select. This feedback can introduce stability issues and is thus undesirable.

While a power supply controller that selects the highest voltage are effective, unnecessary frequent switching may occur when the main and backup power supply voltages are near one another or fluctuate. For example, a main supply voltage may fluctuate from 3.3 volt down to 2.8 volt, and the system may be able to operate normally with this voltage range of 3.3 to 2.8 volts without any problems. However, if the backup supply is a constant 3.0 volts, the power supply controller may switch to the backup supply when the main supply drops below 3.0 volts. This switching is unnecessary since the system can operate down to 2.8 volts. This extra switching can cause glitches or other instability in the system and is undesirable.

What is desired is a power-supply selector that does not merely select the highest power-supply voltage. A power-supply selector circuit is desired that has a programmable voltage threshold. A power-supply selector circuit that continues to use the main power supply even when the backup supply has a higher voltage is desirable, but switches to the backup power supply only when the main supply voltage falls below the programmable threshold voltage. A digitally adjustable voltage threshold is desirable for setting the switching voltage.

DETAILED DESCRIPTION

The present invention relates to an improvement in power-supply selectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
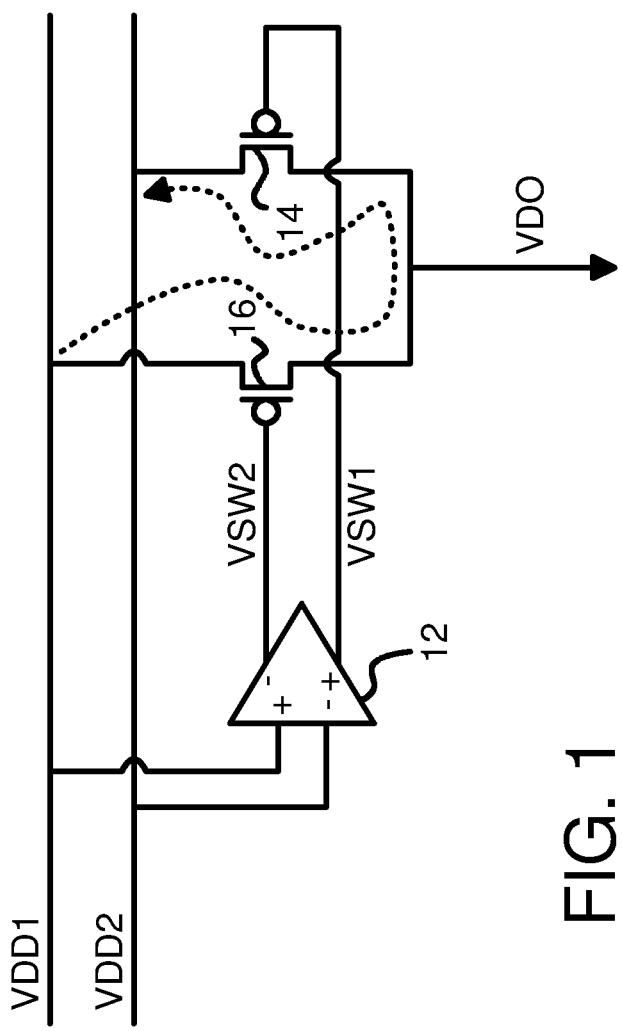
FIG. 1 shows a prior-art power-supply switch.
Figure 2:
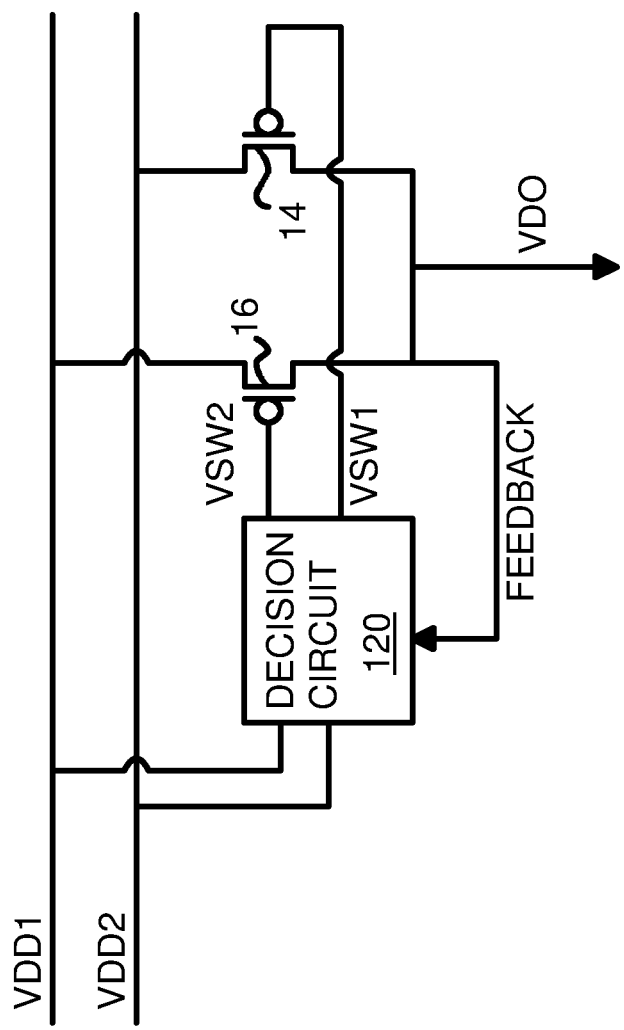
FIG. 2 shows another prior-art power-supply controller.
Figure 3:
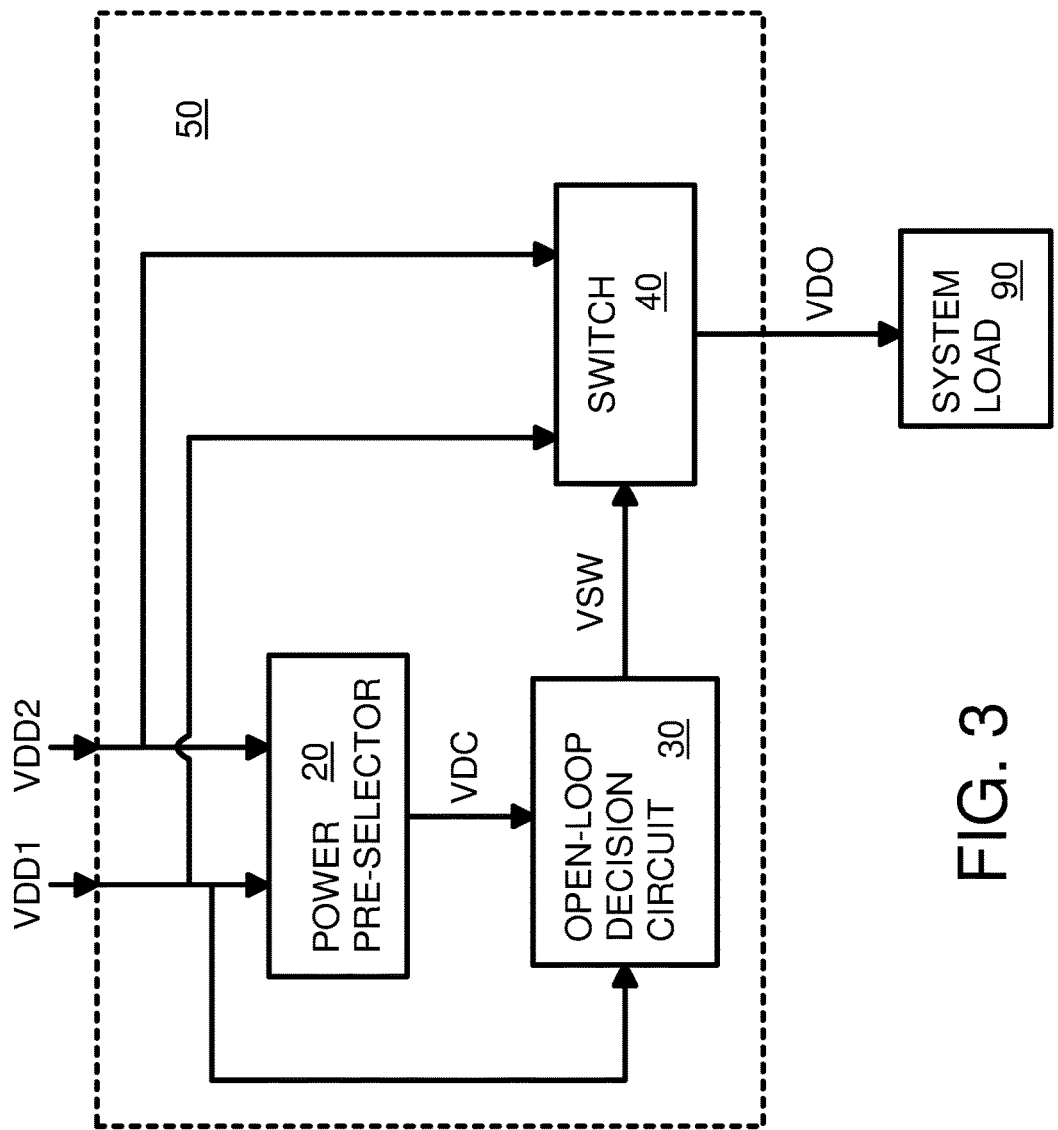
FIG. 3 is a block diagram of a programmable-threshold power supply selector.

FIG. 3 is a block diagram of a programmable-threshold power supply selector. A main power supply generates VDD1 while a backup power supply generates VDD2. It is preferred to use VDD1 even when VDD1 is below VDD2, but still above a threshold VTH. The threshold VTH is programmable.

The two power-supply voltages VDD1 and VDD2 are input to programmable-threshold power supply selector 50. Power pre-selector 20 selects either VDD1 or VDD2 to be a common power VDC that is used internally to power transistors, comparators, and other circuitry within programmable-threshold power supply selector 50.

The main power supply voltage VDD1 but not the backup supply voltage VDD2 is applied to open-loop decision circuit 30. Open-loop decision circuit 30 compares VDD1 to the programmable threshold voltage VTH to generate switch control voltage(s) VSW.

The switch control voltage(s) VSW is applied to switch transistors in switch 40, to control whether VDD1 or VDD2 is connected to drive the output voltage VDO. VDO is the power-supply voltage applied to provide power to the system. The current from switch 40 flows through system load 90, which represents the loading by the system.

Figure 4:
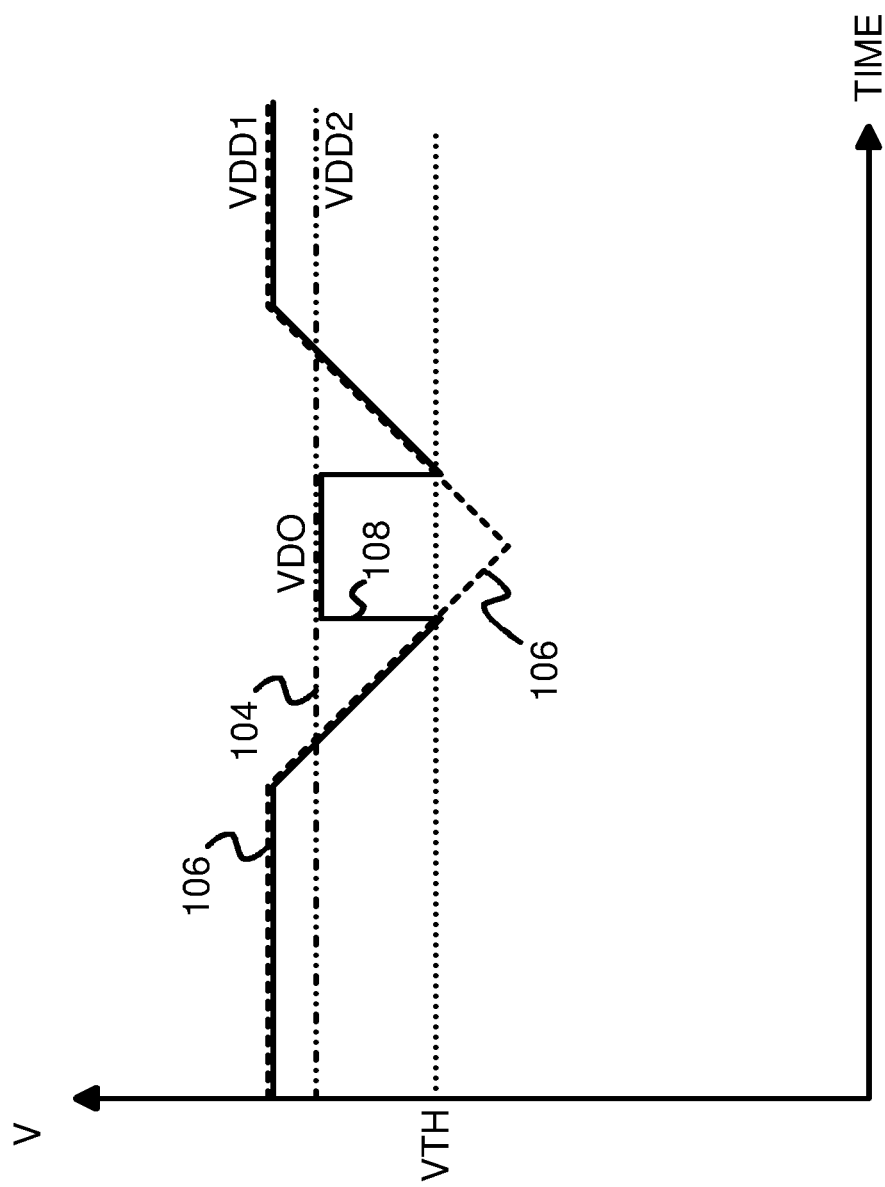
FIG. 4 is a voltage graph showing operation of the programmable-threshold power supply selector.

FIG. 4 is a voltage graph showing operation of the programmable-threshold power supply selector. In this example, the backup power supply generates a voltage VDD2 that is slightly below the main power supply VDD1. Line 104 shows that VDD2 remains constant, while curve 106 shows that VDD1 is initially higher than VDD2 and stable, but in the middle of the graph VDD1 falls below VDD2 before rising back above VDD2.

However, the output power supply voltage VDO, shown by curve 108, does not switch from VDD1 to VDD2 as soon as VDD1 falls below VDD2. Instead, VDO follows VDD1 lower, below VDD2, until VDD1 falls below the threshold voltage VTH. When VDD1 falls below VTH, then curve 108 shows that VDO pulses high to the backup power supply voltage VDD2. The programmable-threshold power supply selector has switched to the backup supply.

VDO continues at VDD2 as VDD1 continues to fall, and then rise again. Once VDD1 rises above threshold voltage VTH, then the programmable-threshold power supply selector switches to the main power supply VDD1, and VDO and curve 108 fall back to VDD1. Curve 108 and VDO continue to follow VDD1 as VDD1 rises and then remains constant at the right end of the graph.

If only one supply is available or connected, and the other supply is open or 0 volts, then programmable-threshold power supply selector 50 connects that available supply to output supply voltage VDO. A small leaker resistor to ground can be connected to each power-supply input to programmable-threshold power supply selector 50 to detect a missing or disconnected power-supply source.

Figure 5:
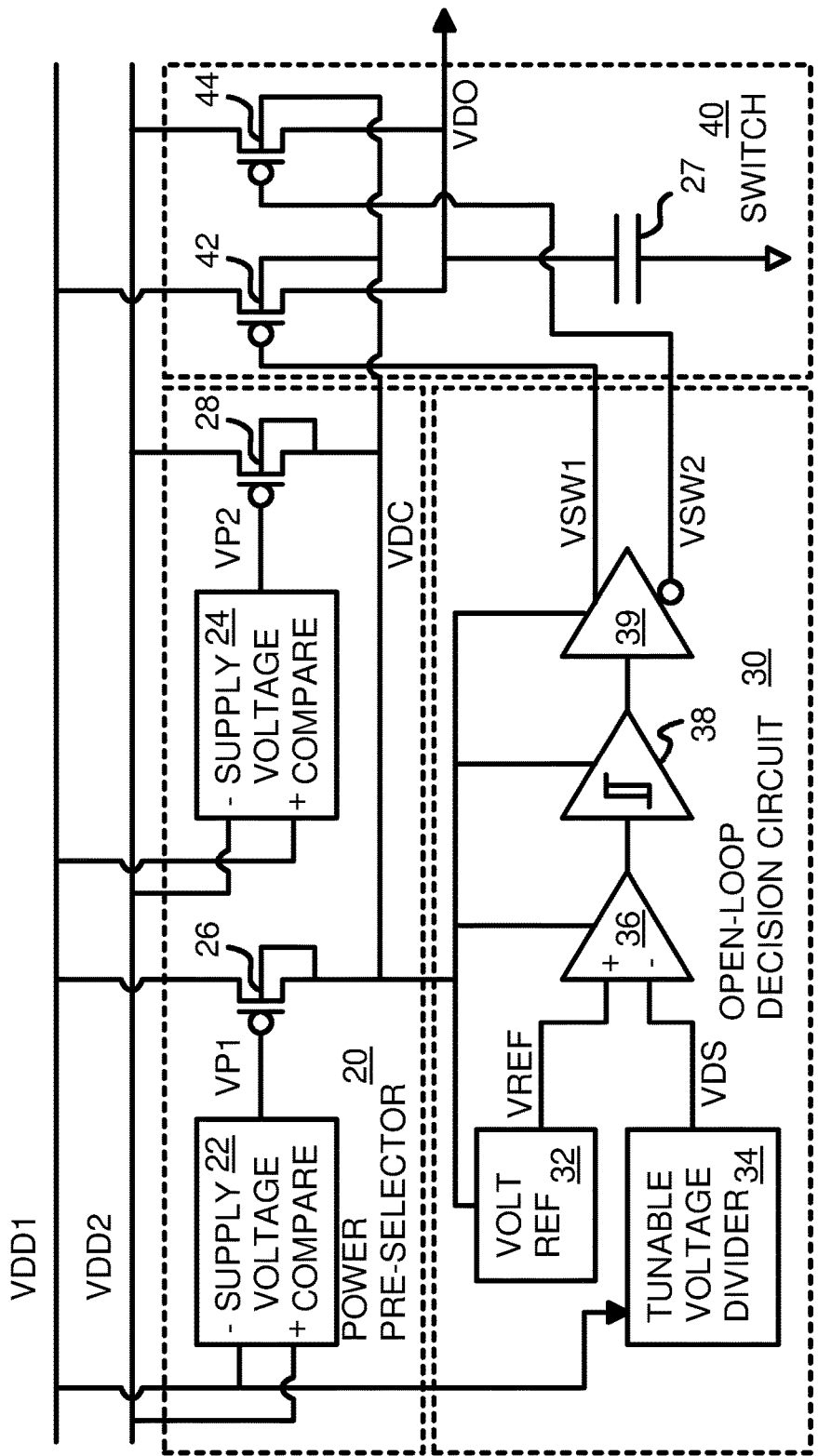
FIG. 5 is a more detailed schematic of the programmable-threshold power supply selector.

FIG. 5 is a more detailed schematic of the programmable-threshold power supply selector. Programmable-threshold power supply selector 50 has three main operational blocks: power pre-selector 20, open-loop decision circuit 30, and switch 40.

Power pre-selector 20 receives both power supply voltages VDD1 and VDD2, and applies them to the inverting (−) and non-inverting (+) inputs of supply voltage comparators 22, 24. The connection of VDD1, VDD2 is reversed for supply voltage comparator 24, which has VDD1 applied to the +input, while supply voltage comparator 22 has VDD1 applied to the −input.

First supply voltage comparator 22 drives VP1 low to enable p-channel pre-select transistor 26 to connect VDD1 to common supply VDC when VDD1 is greater than VDD2. Second supply voltage comparator 24 drives VP2 low to enable p-channel pre-select transistor 28 to connect VDD2 to common supply VDC when VDD2 is greater than VDD1. Thus the higher of VDD1 or VDD2 is applied to common supply voltage VDC.

The internal circuitry of programmable-threshold power supply selector 50 is always powered by the higher supply voltage. VDC can have a different value than output supply voltage VDO. For example, when VDD1 is less than VDD2, but still above threshold VTH, VDC is VDD2, but VDO is VDD1. Thus common supply VDC and output supply voltage VDO can be driven by different power supplies.

The bulk or substrate terminals of p-channel pre-select transistors 26, 28, and of p-channel switch transistors 42, 44, are driven by common supply VDC. Thus the transistors have their bulk nodes connected to the higher supply voltage. This reduces various secondary effects that can reduce transistor drive current.

Common supply VDC also powers circuitry in open-loop decision circuit 30, such as voltage reference generator 32, comparator 36, Schmitt trigger 38, and driver 39. For example, VDC can be applied to the sources and substrates of p-channel transistors in these blocks that normally connect to the power supply.

Voltage reference generator 32 generates a reference voltage VREF from VDC. A bandgap, temperature-compensated, process-compensated, or other reference generator may be used. The main power-supply voltage VDD1 is applied to tunable voltage divider 34. Tunable voltage divider 34 divides VDD1 by a programmable amount to generate scaled voltage VDS. For example, a divisor D may be controlled by programmable registers. Tunable voltage divider 34 then divides input voltage VDD1 by D to generate scaled voltage VDS, or VDS=VDD1/D. The threshold voltage VTH can be calculated as VTH=D*VREF.

Comparator 36 compares VDS to VREF and drives its output high when VDS falls below VREF. This corresponds to VDD1 falling below the threshold voltage VTH, but a scaled comparison is performed for better linearity and circuit functionality. Hysterises is added by Schmitt trigger 38 and then driver 39 generates switch control voltages VSW1 and VSW2 on its non-inverting and inverting outputs.

VSW1 is applied to the gate of p-channel switch transistor 42, while VSW2 is applied to the gate of p-channel switch transistor 44. The drains of p-channel switch transistors 42, 44 are connected together and to output supply voltage VDO. Capacitor 27 filters switching noise or glitches on VDO to provide a smoother output supply voltage VDO.

In operation, when VDD1 falls below the threshold voltage VTH, the output of comparator 36 goes high, and driver 39 drives VSW1 high and VSW2 low. P-channel switch transistor 42 turns off and p-channel switch transistor 44 turns on to connect VDD2 to VDO. Common supply VDC remains at VDD2 when VDD1 is below VDD2.

For example, when VDD1 is 3.3 volts and VDD2 is 3.0 volts, then power pre-selector 20 turns on p-channel pre-select transistor 26 to connect VDD1 to VDC, which is also 3.3 volts.

When D is set to 1.6, tunable voltage divider 34 divides VDD1 by 1.6 to get 2.063 volt fro VDS. Assume that VREF is set to 1.0 volt. Then comparator 36 outputs a low, and driver 39 drives VSW1 low to turn on p-channel switch transistor 42. VDD1 is driven to VDO, which is also 3.3 volts.

If VDD1 fluctuates low, from 3.3 volts down to 1.4 volts, then supply voltage comparator 22 turns off p-channel pre-select transistor 26 and supply voltage comparator 24 turns on p-channel pre-select transistor 28 to connect VDD2 to VDC, which is then 3.0 volts. When 1.4 volt VDD1 is divided by 1.6 by tunable voltage divider 34, the output is less than the 1 volt of VREF, and comparator 36 toggles its output high. Driver 39 drives VSW1 high, turning off p-channel switch transistor 42, and VSW2 low, turning on p-channel switch transistor 44. VDO is then driven by VDD2 to 3.0 volts.

Figure 6:
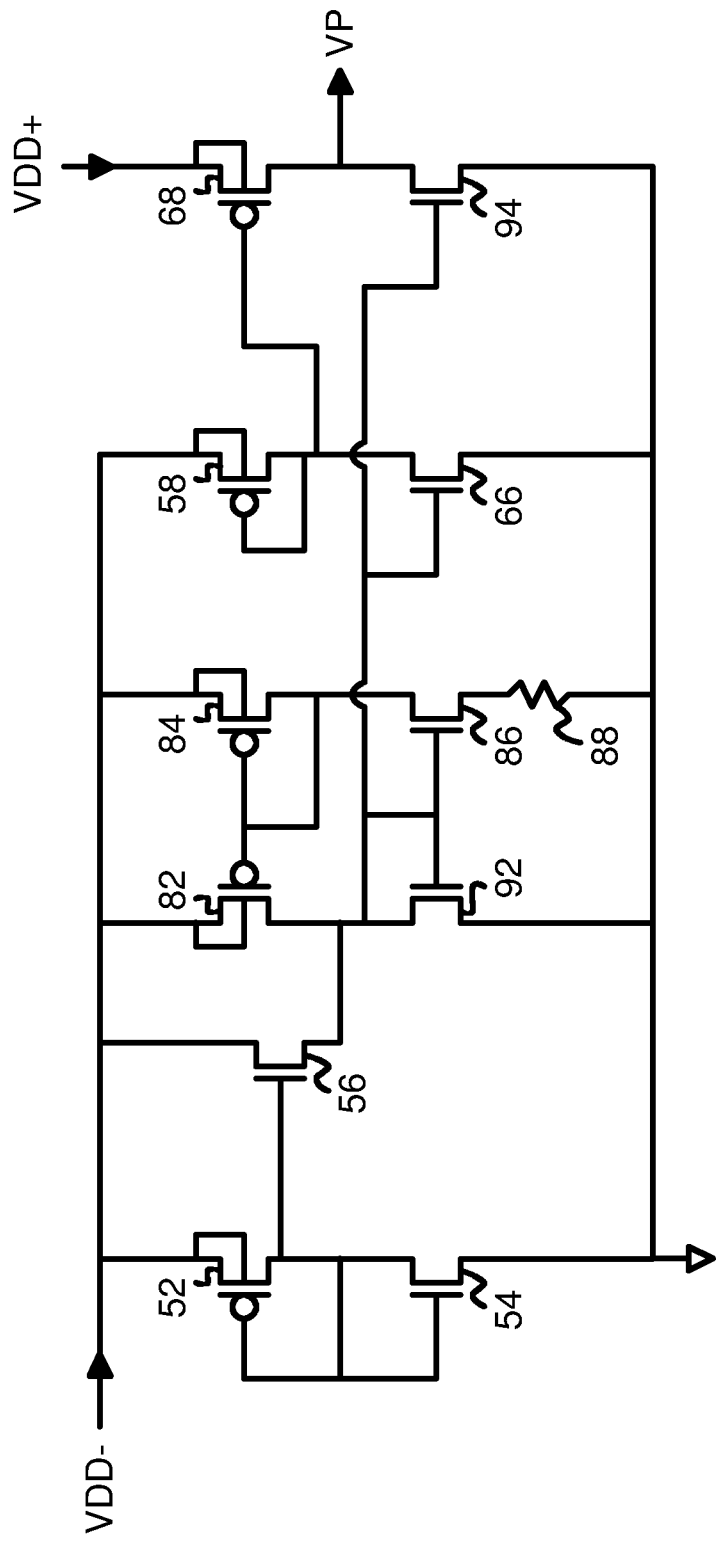
FIG. 6 is a schematic of the supply voltage comparator.

FIG. 6 is a schematic of the supply voltage comparator. Supply voltage comparator 22 has a non-inverting +input and an inverting −input. Supply voltage comparators 22, 24 use the same circuit arrangement, but have a different connection of VDD1, VDD2 to their + and −inputs.

The inverting input VDD− drives the sources and substrates of p-channel transistors 52, 58, 82, 84, while the non-inverting inputs drives VDD+ to the source and substrate terminals of p-channel transistor 68. Ground is connected to the sources and substrates of n-channel transistors 54, 66, 92, 94.

A power-up signal is provided by p-channel transistor 52 and n-channel transistor 54, which have their gates and drains connected together and to the gate of n-channel transistor 56. In initializing current is provided by n-channel transistor 56 from VDD– to the drains of transistors 82, 92, which carry a reference voltage generated by transistors 82, 92 from a current mirrored through transistors 84, 86, and through tail resistor 88. The gates of p-channel transistors 82, 84 are connected together and to the drain node between transistors 84, 86. The gates of n-channel transistors 92, 86 are connected together and to the drain of transistor 92. This generated reference voltage is also applied to the gates of n-channel transistors 66, 94.

A voltage comparison circuit if formed by transistors 58, 66, 68, 94. VDD– is applied to the source and bulk of p-channel transistor 58, while VDD+ is applied to the source and bulk of p-channel transistor 68. The gates of p-channel transistors 58, 68 are connected together and to the drain of p-channel transistor 58. The output of supply voltage comparator 22 is node VP between the drains of transistors 68, 94.

In operation, when VDD+ is higher than VDD–, more current is sourced through p-channel transistor 68 than through p-channel transistor 58 since they have identical gate voltages. The higher current through transistor 58 also passes through n-channel transistor 94, causing its drain, VP, to rise in voltage. The higher VP turns off p-channel pre-select transistor 26 or 28.

When VDD+ is lower than VDD–, less current is sourced through p-channel transistor 68 than through p-channel transistor 58 since they have identical gate voltages. The lower current through transistor 58 also passes through n-channel transistor 94, causing its drain, VP, to fall in voltage. The lower VP turns on p-channel pre-select transistor 26 or 28.

Figure 7:
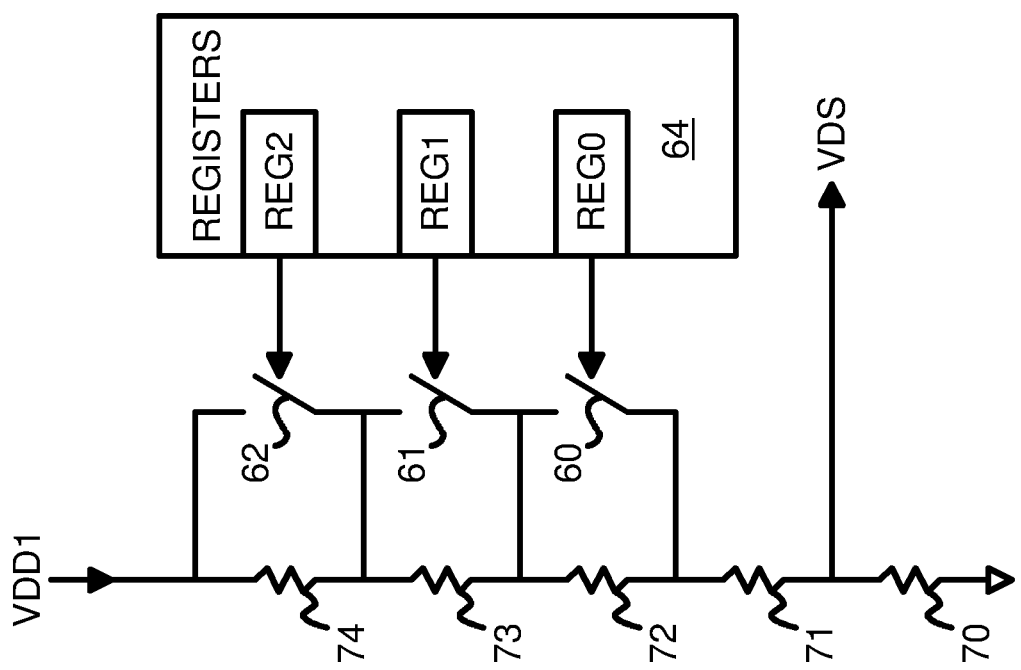
FIG. 7 shows the tunable voltage divider in more detail.

FIG. 7 shows the tunable voltage divider in more detail. Tunable voltage divider 34 can be implemented as a resistor voltage divider with a series of resistors 70-74 between VDD1 and ground. Switches 60, 61, 62 bypass resistors 72, 73, 74, respectively, reducing the series resistance between VDD1 and ground for each resistor bypassed. Register control bits in programmable register 64 control switches 60, 61, 62. A control word can be written into programmable register 64, such as by software or firmware, to change the total resistance in tunable voltage divider 34.

Scaled voltage VDS is taken as the voltage generated between resistor 71 and tail resistor 70. The voltage dividing ratio D is a function of the resistance RT and R0:

$$D=VDD1/VDS=(RT+R0)/R0$$

where R0 is the resistance of tail resistor 70 and RT is the sum of the resistances of resistors 74, 73, 72, 71 when enabled by the corresponding one of switches 62, 61, 60 being open. Any of resistors 74, 73, 72 that are bypassed by a closed one of switches 62, 61, 60 are not included in the resistance sum RT.

The voltage dividing ratio D can be changed by changing the control word in programmable register 64 to bypass more or fewer resistors in tunable voltage divider 34. There may be many more or fewer resistors and bypass switches than shown in FIG. 7, and the resistors could have the same resistance values, or could have different resistance values.

Figure 8:
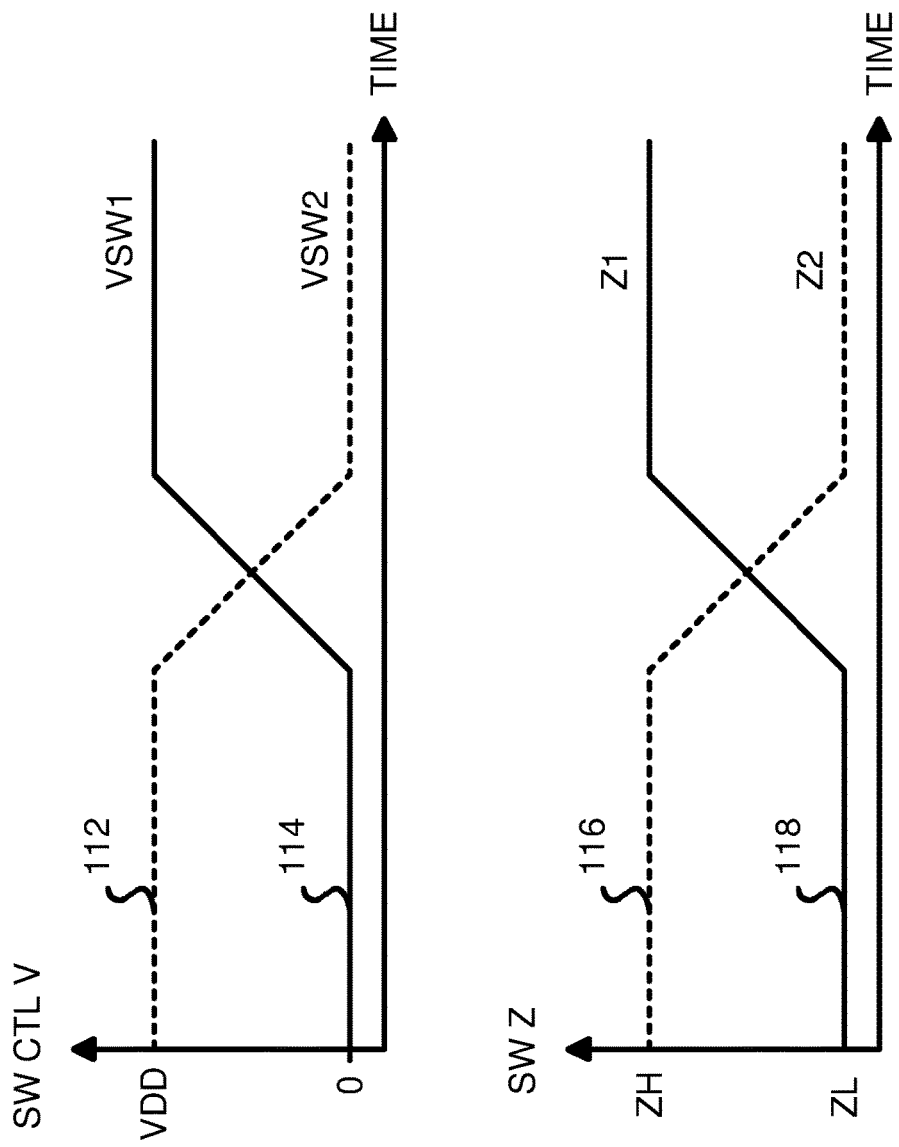
FIG. 8 shows switching waveforms for the programmable-threshold power supply selector.

FIG. 8 shows switching waveforms for the programmable-threshold power supply selector. Open-loop decision circuit 30 and driver 39 can be carefully designed to avoid periods of time when both VSW1 and VSW2 are low when feed-through could occur through p-channel switch transistors 42, 44. Driver 39 drives VSW1 high, shown by curve 114, at the same time that VSW2 is being driven low, as shown by curve 112. Thus there is no time when both VSW1 and VSW2 are low.

When VSW1 is driven from low to high, the impedance Z1 of p-channel switch transistor 42 changes from a low-impedance ON state to a high-impedance OFF state, as shown by curve 118. At the same time, driver 39 also drives VSW2 from high to low. The impedance Z2 of p-channel switch transistor 44 changes from a high-impedance OFF state to a low-impedance ON state as shown by curve 116.

Since p-channel switch transistors 42, 44 are never both in the low-impedance state, a large short-through current between the main and backup power supplies is avoided.

The programmable-threshold power supply selector allows for programming the switching decision using programmable registers in tunable voltage divider 34. Stable operation is achieved since there is no feedback that can cause instability. The circuit can be fabricated using standard complementary metal-oxide-semiconductor (CMOS) processes. Frequent switching of the power supply is avoided since the main power supply VDD1 is compared to a programmable threshold VTH rather than to the backup power supply VDD2. The threshold for switching is VTH, not VDD2. This threshold for switching, VTH, can be programmed to a desired value, or several values can be tested and evaluated in a lab or on an end system, and a VTH value producing the best results can be selected.

Alternate Embodiments

Several other embodiments are contemplated by the inventors. For example many values of the power supplies could be used other than 3.3 or 3.0 volts. The threshold voltage VTH can be programmed to a range of values, and the divisor could be changed. For example, the divisor could be programmable with 8 levels or steps, such as from 1.45 volt to 1.8 volts, with a step of 0.05 volts. Different amounts of hysteresis could be provided by Schmitt trigger 38, such as 60 mV, or no hysteresis could be provided and Schmitt trigger 38 could be deleted. A programmable register or other programming option to control Schmitt trigger 38 could allow for the amount of hysteresis to be programmable. Edge-shaping circuits such as delay lines before NAND gates, one-shots, and anti-glitch circuits could be added to ensure than VSW1 and VSW2 do not overlap.

Components such as capacitors or resistors for RC delays or for filtering could be added. Sensing devices or circuits could be added to sense when no power supply is connected on an input, and the behavior of the programmable-threshold power supply selector could be adjusted or over-ridden. The system load can be considered a dummy load for modeling purposes, and may vary significantly in time as the system operates.

The main power supply and the backup supply could have the same nominal voltage, or could have different values. The main power supply could be disconnected, allowing the backup power supply to continue powering the system. Various additional circuits could be provided, such as for generating alarms when switching occurs or status signals to indicate when a power supply is connected or disconnected, or above or below a target voltage. Many circuit designs could be substituted for various blocks, such as for voltage reference generator 32, tunable voltage divider 34, supply voltage comparators 22, 24, Schmitt trigger 38, driver 39, etc. Multiple transistors may be used in parallel or in other arrangements for the switches.

The threshold VTH could be adjusted for different applications or environments. For example, some mission-critical applications may require a very stable power supply voltage, and VTH could be set fairly close to the nominal VDD1. Other applications such as portable games or toys could have VTH set far away from the nominal VDD1 since failure would not cause critical issues.

While p-channel transistors have been described, other kinds of transistors could be substituted. Full CMOS transmission gates could be used. Gate voltages could be boosted, such as by a charge pump, especially when n-channel transistors are used. Negative bias generators could also be used for p-channel gates to increase gate drive.

Guard rings and other features may be added to transistors such as the switch transistors, and increased gate lengths may be used to reduce various unwanted side effects. Other components, such as capacitors, resistors, or transistors may be added to various nodes for filtering, smoothing waveforms, suppressing glitches, circuit startup, or for other purposes. Power-down circuitry may be added to reduce power for low-power modes. Filters may be added to suppress artifacts from the particular kinds of power supplies used, such as to suppress 120 Hz artifacts or harmonics. Programmable-threshold power supply selector 50 could be integrated into a larger power controller or power supply system or sub-system.

Various kinds of power sources could be used to supply the power supply voltages VDD1 and VDD2. An alternating-current (A.C.) adapter that plugs into a standard wall electrical socket could provide a Direct Current (D.C.) power-supply voltage, either directly, or after a power conditioning or filtering circuit. A battery, large capacitor, solar panel or cell, or other kind of energy storage or generating device could supply either the main or the backup power. Since VDD1 is used by default by the programmable-threshold power supply selector, VDD2 could be driven by a power source that is intended to be conserved, or could be a more expensive power source, while VDD1 is a cheaper power source. Thus costs could be reduced using the programmable-threshold power supply selector with the less expensive power source connected to VDD1 and the expensive power source connected to VDD2.

There may be periods of time when one power source is disconnected or not able to deliver power. For example, a solar cell could not deliver power at night, but could be used during the day to reduce power costs from a standard electric outlet and AC adapter. In that case, the solar cell could be connected as VDD1 and the AC adapter as VDD2, so that cheaper solar power is used when available.

More than two power sources VDD1, VDD2 could be supported. The entire programmable-threshold power supply selector 50 could be duplicated one or more times, with a different pair of VDD1, VDD2, VDD3, . . . applied to the copies of programmable-threshold power supply selector 50. Alternately, several programmable-threshold power supply selectors 50 could be cascaded together in a tree or funnel structure from multiple power sources. In another alternative, an additional pair of supply voltage comparators 22, 24 and p-channel pre-select transistors 26, 28 could be added for each additional power supply to allow for a 3-way comparison for all possible combinations. Additional switch transistors could be added, and another open-loop decision circuit 30 could be used to generate more switch control signals. Alternately, some power supplies could be only partially supported, such as for a less-preferred backup source where full comparisons to all other power supply voltages is not supported, only partial comparisons.

The divisor for tunable voltage divider 34 could be directly stored in a programmable register, or could be indirectly stored, such as by control bits that control the bypass switches. A programmable register could store and encoded version of the divisor, or some other indicator that causes tunable voltage divider 34 to divide by a pre-determined divisor value. Various encoding, decoding, and other schemes may be employed in converting a value in a programmable register to control tunable voltage divider 34.

While positive power supply voltages and zero-volt ground have been described, these voltage levels could be shifted or use a different reference point. Fully differential systems might use a positive power supply voltage and a negative power supply voltage with ground as the reference in the middle. This can be considered as a shift in voltage levels.

While p-channel complementary metal-oxide-semiconductor (CMOS) transistors have been described, other kinds of transistors could be substituted for some embodiments, such as n-channel only, p-channel only, or various alternate transistor technologies such as Bipolar or BiCMOS.

While descriptions of current flows and operations have been presented, these are theoretical and the theories may be incomplete or even incorrect. Regardless of the physical mechanisms and theoretical interpretations, the circuit does switch power supplies. Especially for small devices, currents may flow in unusual ways and using mechanisms that have not yet been thoroughly researched and understood.

While descriptions of operation have been given based on a theoretical understanding of the physical processes, these theoretical descriptions may be incorrect. Second and third order effects may also be present. Various mechanisms may be responsible for isolation and conduction under various conditions.

Devices may be implemented using n-channel, p-channel, or bipolar transistors, or junctions within these transistors. A capacitor could be attached to a resistance to provide an R-C time delay, or more complex circuits such as active triggering circuits may be added. In some embodiments, high-voltage transistors may be used rather than low-voltage transistors with appropriate bias conditions. The gate lengths and spacings can be increased to provide better protection from damage.

Different transistor, capacitor, resistor, and other device sizes can be used, and various layout arrangements can be used, such as multi-leg, ring, doughnut or irregular-shape transistors. Additional taps, guard rings, transistors, and other components may be added. More than two power supplies may be used.

Additional leaker devices such as resistors and small transistors could be added. Parasitic capacitances and resistances may be used from some components, depending on the process and device sizes used. Bias, VDD, and voltage values may vary somewhat due to process, temperature, and design variances.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A power supply selector circuit comprising:
   a first power-supply input for receiving a first power-supply voltage;
   a second power-supply input for receiving a second power-supply voltage;
   a power pre-selector, connected to the first power-supply input and to the second power-supply input, for comparing the first power-supply voltage to the second power-supply voltage,
   a common supply node generated by the power pre-selector, wherein the power pre-selector connects the first power-supply input to the common supply node when the first power-supply voltage is above the second power-supply voltage, and wherein the power pre-selector connects the second power-supply input to the common supply node when the first power-supply voltage is below the second power-supply voltage;
   an open-loop decision circuit, powered by the common supply node and connected to the first power-supply input, the open-loop decision circuit comparing the first power-supply voltage to a threshold voltage and activating a first switch signal when the first power-supply voltage is above the threshold voltage, and activating a second switch signal when the first power-supply voltage is below the threshold voltage;
   an output supply node for powering a system load;
   a first switch that connects the first power-supply input to the output supply node when the first switch signal is activated, and for isolating the first power-supply input from the output supply node when the first switch signal is not activated; and
   a second switch that connects the second power-supply input to the output supply node when the second switch signal is activated, and for isolating the second power-supply input from the output supply node when the second switch signal is not activated;
   wherein the power pre-selector further comprises:
   a first supply voltage comparator, connected to the first power-supply input and to the second power-supply input, for comparing the first power-supply voltage to the second power-supply voltage to generate a first pre-select signal that is active when the first power-supply voltage is greater than the second power-supply voltage;
   a first pre-select transistor having a gate receiving the first pre-select signal, for connecting the first power-supply input to the common supply node in response to the first pre-select signal;
   a second supply voltage comparator, connected to the second power-supply input and to the first power-supply input, for comparing the second power-supply voltage to the first power-supply voltage to generate a second pre-select signal that is active when the second power-supply voltage is greater than the first power-supply voltage; and
   a second pre-select transistor having a gate receiving the second pre-select signal, for connecting the second power-supply input to the common supply node in response to the second pre-select signal;
   wherein the first supply voltage comparator further comprises:
   a first p-channel sense transistor that has a source and a substrate connected to the first power-supply input, a gate and a drain connected to a gate mirror node;
   a second p-channel sense transistor that has a source and a substrate connected to the second power-supply input, a gate connected to the gate mirror node, and a drain connected to the first pre-select signal;
   a first initializing n-channel transistor having a drain connected to the first pre-select signal and a gate connected to a first initializing node and a source connected to a ground;
   a second initializing n-channel transistor having a drain connected to the first power-supply input, a source connected to the first initializing node, and a gate connected to an initializing divider node;
   a divider p-channel transistor having a source and a substrate connected to the first power-supply input, and a gate and a drain connected to the initializing divider node;
   a divider n-channel transistor having a source connected to the ground, and a gate and a drain connected to the initializing divider node, whereby the first power-supply input is switched to the output supply node in response to comparison with the threshold voltage, while the common supply node is switched in response to comparison between the first and second power-supply voltages.

2. The power supply selector circuit of claim 1 wherein the second supply voltage comparator further comprises:
   a third p-channel sense transistor that has a source and a substrate connected to the second power-supply input, a gate and a drain connected to a second gate mirror node; and
   a fourth p-channel sense transistor that has a source and a substrate connected to the first power-supply input, a gate connected to the second gate mirror node, and a drain connected to the second pre-select signal.

3. The power supply selector circuit of claim 2 wherein the first power-supply input is connected to the output supply node by the first switch when the first power-supply voltage is less than the second power-supply voltage and greater than the threshold voltage;

wherein the first power-supply input continues to be connected to the output supply node when the second power-supply voltage is greater than the first power-supply voltage, and the first power-supply voltage has not yet fallen below the threshold voltage;

wherein the open-loop decision circuit receives no feedback from the output supply node;

wherein the open-loop decision circuit is a stable circuit since no feedback is used.

4. The power supply selector circuit of claim 1 wherein the threshold voltage is programmable, wherein the output supply node continues to be driven by the first power-supply input through the first switch while the first power-supply voltage is above the threshold voltage which is programmable.

5. The power supply selector circuit of claim 1 wherein the open-loop decision circuit further comprises:

a voltage reference generator, powered by the common supply node, for generating a reference voltage;

a voltage divider, receiving the first power-supply input, for dividing the first power-supply voltage by a divisor to generate a divided first power-supply voltage;

a comparator that compares the divided first power-supply voltage to the reference voltage;

wherein the comparator is powered by the common supply node.

6. The power supply selector circuit of claim 5 further comprising:

a programmable register for storing a divisor indicator that can be re-programmed with different values;

wherein the divisor used by the voltage divider is determined by the divisor indicator from the programmable register.

7. The power supply selector circuit of claim 6 wherein the voltage divider further comprises:

a series of resistors connected in series between the first power-supply input and an output generating the divided first power-supply voltage;

a plurality of bypass switches, controlled by the divisor indicator from the programmable register, for selectively bypassing resistors in the series of resistors to reduce a total series resistance between the first power-supply input and an output generating the divided first power-supply voltage.

8. The power supply selector circuit of claim 6 wherein the threshold voltage VTH, the divisor D, and the reference voltage VREF are related to each other by an equation $VTH = VREF * D$, wherein the threshold voltage is effectively programmable by programming the divisor using the programmable register.

9. The power supply selector circuit of claim 5 wherein the open-loop decision circuit further comprises:

a Schmitt trigger that receives an output from the comparator and adds hysteresis;

a driver that receives an output from the Schmitt trigger and generates the first switch signal and the second switch signal;

wherein the Schmitt trigger and the driver are powered by the common supply node.

10. The power supply selector circuit of claim 9 wherein the first switch signal is generated by a non-inverting output of the driver and the second switch signal is generated by an inverting output of the driver;

wherein the first and second switch signals are not both activated at a same time;

wherein the first and second switch signals are non-overlapping.

11. The power supply selector circuit of claim 10 wherein the voltage reference generator is a bandgap voltage generator.

12. The power supply selector circuit of claim 5 wherein the first switch is a p-channel transistor having a substrate connected to the common supply node, a gate receiving the first switch signal, and source/drains connected to the first power-supply input and to the output supply node;

wherein the first switch signal is active when low;

wherein the second switch is a p-channel transistor having a substrate connected to the common supply node, a gate receiving the second switch signal, and source/drains connected to the second power-supply input and to the output supply node;

wherein the second switch signal is active when low.

13. The power supply selector circuit of claim 1 wherein the first and second pre-select transistors are p-channel transistors having substrates connected to the common supply node.

\* \* \* \* \*